United States Patent [19]
Sparer et al.

[11] Patent Number: 5,620,646
[45] Date of Patent: Apr. 15, 1997

[54] METHOD FOR COOLING ELECTRICAL COMPONENTS IN A PLASTICS PROCESSING MACHINE

[75] Inventors: Ronald M. Sparer, Madeira; Edward A. Chorey, Cincinnati; Gregory L. Seibert, Bethel, all of Ohio

[73] Assignee: Cincinnati Milacron Inc., Cincinnat, Ohio

[21] Appl. No.: 553,791

[22] Filed: Oct. 23, 1995

Related U.S. Application Data

[62] Division of Ser. No. 231,080, Apr. 22, 1994, Pat. No. 5,523,640.

[51] Int. Cl.⁶ .................... H05K 7/20; H02K 9/00
[52] U.S. Cl. ................... 264/328.14; 62/259.2; 165/104.33; 257/714; 264/349; 310/54; 361/698; 361/699; 361/701; 425/143
[58] Field of Search .................... 257/714; 310/54, 310/64, 68 C; 62/414, 418, 259.2; 165/80.3, 80.4, 104.33; 361/688, 694, 695, 698, 699, 700, 701, 704, 707; 264/328.14, 319, 349; 425/143

[56] References Cited

U.S. PATENT DOCUMENTS

| | | | |
|---|---|---|---|
| 3,933,958 | 1/1976 | Hinrichs | 264/40.6 |
| 3,963,950 | 6/1976 | Watanabe et al. | 310/54 |
| 4,120,021 | 10/1978 | Roush | 361/388 |
| 4,139,049 | 2/1979 | Baumann et al. | 425/435 |
| 4,317,952 | 3/1982 | Armor et al. | 134/15 BH |
| 4,503,483 | 3/1985 | Basiulis | 361/385 |
| 4,513,346 | 4/1985 | Devins | 361/701 |
| 4,516,044 | 5/1985 | Bone | 310/64 |
| 4,691,131 | 9/1987 | Nakano | 310/54 |
| 4,837,490 | 6/1989 | Neko | 318/568.1 |
| 4,865,123 | 9/1989 | Kawashima et al. | 361/701 |
| 4,884,168 | 11/1989 | August et al. | 361/382 |
| 4,930,570 | 6/1990 | Okayasu | 361/701 |
| 5,001,601 | 3/1991 | Fuoco | 361/385 |
| 5,079,619 | 1/1992 | Davidson | 361/701 |
| 5,084,642 | 1/1992 | Katsuzawa et al. | 310/54 |
| 5,138,206 | 8/1992 | Schmidt | 310/12 |
| 5,177,666 | 1/1993 | Bland et al. | 361/382 |
| 5,285,347 | 2/1994 | Fox et al. | 361/699 |
| 5,313,698 | 5/1994 | Schaeftlmeier et al. | 264/272.2 |
| 5,417,558 | 5/1995 | Heindel et al. | 425/145 |
| 5,436,038 | 7/1995 | Silvey | 425/135 |
| 5,580,584 | 12/1996 | Mussler et al. | 425/145 |

OTHER PUBLICATIONS

DeBaspari, "Making Sense of K'92–Injection Molding", pp. 66–71, Plastics Technology. Jan. 1993.

Rogers, "All–electric presses move into mainstream processing", pp. 38–41, Modern Plastics International. Apr. 1993.

*Primary Examiner*—Jill L. Heitbrink
*Attorney, Agent, or Firm*—Stephen H. Friskney

[57] ABSTRACT

A cooling method that involves circulating a liquid coolant through the motor housings and mounting surfaces for electrical/electronic components, such as the electric motors and associated electronic drives, in electric plastic processing machines. Specifically, the motors are provided with a housing having an integral heat exchanger, such as stainless steel tubing cast into a cylindrical aluminum stator housing. The various electrical/electronic components are mounted to the surface of a plate type heat exchanger (chill plate) that is contained within the electrical cabinet for the primary electrical circuitry. In addition, the air within the electrical cabinet is continually circulated over the chill plate to provide a more uniform temperature distribution within the enclosure and minimize condensation on the surface of the plate. The heat generated by the motors and electronics is absorbed from the motor housings and chill plate by the circulating liquid and released through a heat exchanger.

6 Claims, 5 Drawing Sheets

METHOD FOR COOLING ELECTRICAL COMPONENTS IN A PLASTICS PROCESSING MACHINE

This is a division of application Ser. No. 08/231,080, filed Apr. 22, 1994, now U.S. Pat. No. 5,523,640.

FIELD OF THE INVENTION

The present invention relates to liquid cooling of electrical components, and more particularly to a combined system to provide liquid cooling of the electrical motors and associated drives in a plastics processing machine, such as an injection molding machine.

DESCRIPTION OF THE RELATED ART

It is well known that electric motors produce heat during their operation. Usually the amount of heat produced increases with the increasing horsepower of the electric motor. This heat causes breakdown of the insulation of the wiring, reduces the efficiency of the motor, causes deterioration of non-metallic components, such as seals, and can produce premature failure of metallic parts of the motor. In particular, the heat generated during application of high current to a ceramic magnet DC motor can degrade the magnetic properties, resulting in a reduction of torque available from the motor. As plastics processing machines, such as injection molding machines, increasingly use electric motors to power the drive systems of the machine, the problem of heat dissipation increases.

Attempted solutions to the problem of removing heat from electric motors has been approached in a variety of ways. For example, fins have been used on motor housing to dissipate the heat, fans have been incorporated inside electric motors for air cooling, air circulation patterns of numerous designs inside electric motors have been used, and externally mounted blowers have been used to maximize air cooling capability. However, these methods of air cooling are largely ineffective for motors in plastics processing machines where the motors typically run at high current but low rotational speed. The high current generates significant heat, but the low speed renders integral, rotor mounted fans ineffective. The external blowers are not a satisfactory solution due to the high audible noise and possibility of contamination associated with this type of forced air circulation.

Since the thermal conductivity for a liquid coolant is much better that circulating air, a known alternative to air cooling of electric motors is liquid cooling. Where liquid cooling of an electric motor has been used, one approach is to provide the motor with a heat exchange jacket having passageways for the circulation of the liquid through the jacket. Alternatively, a liquid-cooled motor can have a cooling liquid circulated through the laminated core of the stator. In both of these cooling methods there is an advantage over an air cooled motor in that the cooling median is capable of a high heat removing efficiency, and thus the fluid cools the motor at a high efficiency. In some cases, with the higher efficiency of liquid cooling, it is possible to reduce the size of an electric motor required for a particular application, resulting in a more economical machine construction.

It should be noted, however, that liquid cooling of motors has not been used in plastics processing machines. Instead, prior art solutions for motor temperature control in machines of this type have involved external forced air circulation and/or limiting functional capabilities. As proposed by U.S. Pat. No. 4,837,490, for example, when overheat conditions are detected, the injection molding cycle time is lengthened to reduce the load on the motors. To make the motors more resistant to the negative effects connected with high current and elevated operating temperatures, expensive rare earth magnets are often used as an alternative to ceramic magnets, since they are less affected by such conditions.

In addition to the previously stated problems associated with motors, the reliability of many electronic components is known to decrease significantly with increasing temperature. It is also known that the operating characteristics for these electronic components vary appreciably over their range of operating temperatures so that the performance often deteriorates significantly with increasing temperature. It has also been found that less power is required to operate a component when the component is maintained at a cooler temperature. At high temperatures, however, such devices require more power to operate, to a point where they can be rendered virtually unusable; this can occur long before complete failure of the component is reached. In fact, it has been generally found that the life span of some electronic components is directly related to the temperatures at which the component operates. In general, the life span of some electronic components may be cut in half by increasing the operating temperature of the component by 10° C.

The primary device typically used to cool electrical/electronic components, such as those found in drives for electrical motors, is a heatsink. A heatsink generally consists of a large conducting plate to which the electronic components are attached in a heat conducting relationship. Since a significant number of components are included in electrical motor drive systems, forced air is typically circulated over the heatsinks to enhance the cooling effect. However, in some cases, the forced air approach has been proven to be only marginally effective. For example, airborne contaminants may be drawn into the forced air system, causing problems related to filtering, corrosion of components, and surface build-up that impedes heat transfer.

An effective alternative to forced air is to mount the components on an independently cooled, plate type heat exchanger. Passageways of some type are formed in the plate so that a cooling fluid can be circulated through the plate, the plate in effect operating as a form of heat sink. Precise temperature control of the plate is very important to avoid condensation of moisture from the ambient air. The use of plate type heat exchangers in different applications has shown that it is desirable to have the ability to remove the electronic components easily from the plate, perhaps in a modular fashion.

In electrically driven plastics processing machines there may be as many as three or more high horsepower electric motors and associated electronic drives which require cooling. Although liquid cooling systems have been proposed for electronics and motors separately, there has not been a combined system with sufficient capacity to cool both the motors and drives used in machines of this type. The advantages of a combined liquid cooling system in plastics processing machines have not been achieved in prior art systems where heat generated by the motors is controlled by simply limiting machine capabilities.

SUMMARY OF THE INVENTION

Accordingly, it is an object of the present invention to overcome the shortcomings of the prior art and provide a cooling system specifically adapted to plastic processing machines which will extend the life of electronic components and provide more efficient and consistent motor operation.

The present invention accomplishes the stated objective by providing a cooling system which circulates a liquid through the motor housing and mounting surfaces for electronic components. This system is particularly cost effective where there are multiple electric motors and associated electronic drives, as in electric plastic processing machines. If desired, other machine elements or systems requiring cooling, such as the feed throat of the injection unit, can also be included in the system.

For example, the present invention can be used in an electric injection molding machine to cool the motors that drive mechanisms for the clamp, injection, extruder and part ejection systems, as well as the associated electronic drives. Specifically, the motors are provided with a housing having an integral heat exchanger, such as stainless steel tubing cast into a cylindrical aluminum housing. This allows for rapid dissipation of the heat produced by high current loading, effectively maintaining a safe, uniform operating temperature for the motor. Since the operating temperature is maintained at a desired level, the motor's permanent magnets are less susceptible to weakening or demagnetization, facilitating use of economical ceramic magnets.

The electronic components are mounted to the surface of a plate type heat exchanger that is contained within a compartment for the primary electrical circuitry. In addition, the air within the electrical enclosure is continually circulated to enhance the heat exchange capabilities of the plate, providing a more uniform temperature distribution within the enclosure and minimizing the likelihood of condensation on the surface of the plate. The heat generated by the motors and electronics is absorbed from the motor housings and plate by a circulating liquid and released to a heatsink. In one embodiment, certain electronic resistors, such as those used for dynamic braking, are cast into the plate-type heat exchanger so that the heat transfer from these components is optimized and space is saved by making this an integral construction.

DESCRIPTION OF THE PREFERRED EMBODIMENT

Although the present invention is applicable to various plastic processing machines, the following description is presented in connection with an injection molding machine having an electro-mechanical drive system. Accordingly, a brief description of this type of machine is useful in understanding the present invention.

Figure 1:
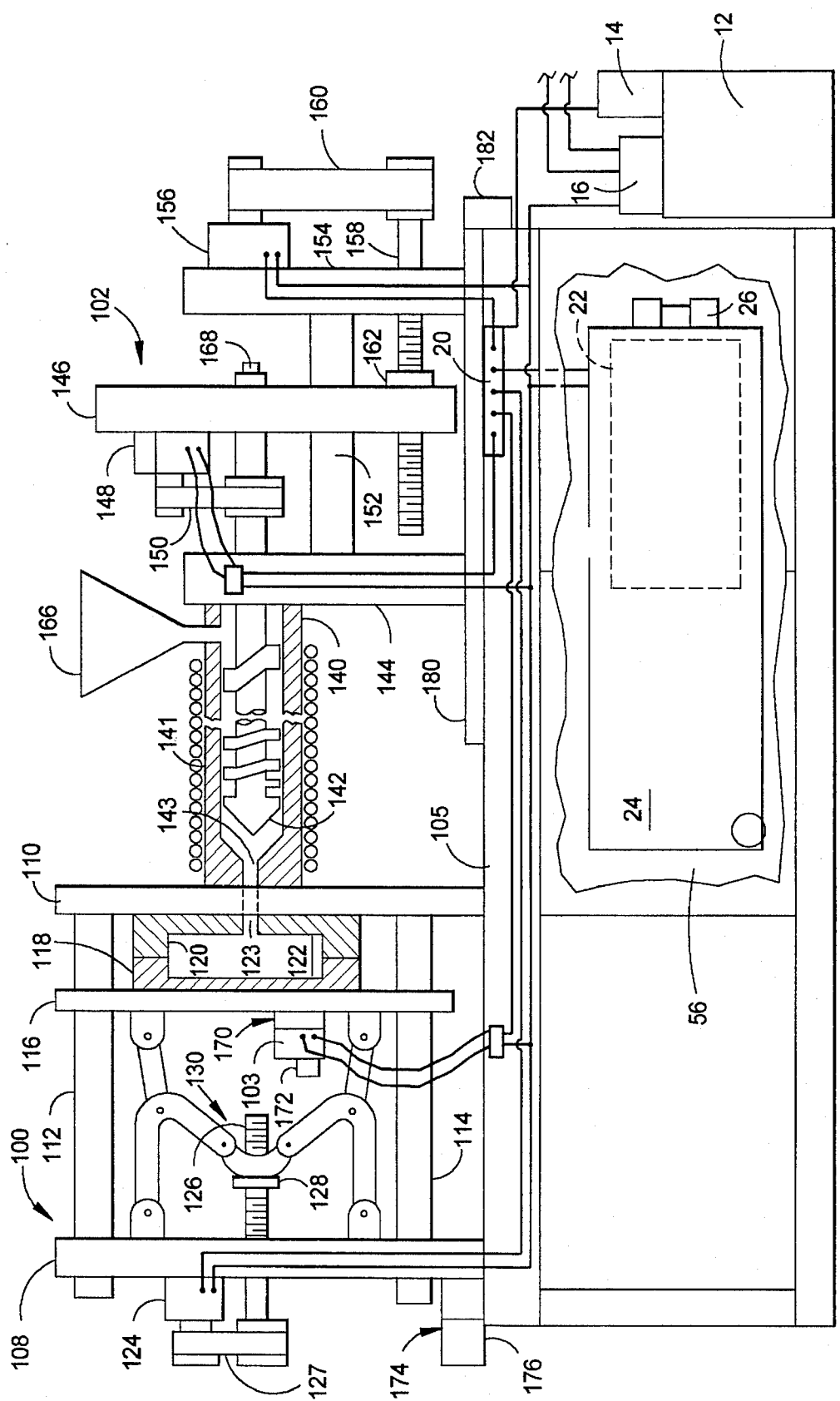
FIG. 1 is a front elevational view of an injection molding machine equipped with a cooling system of the present invention.

FIG. 1 illustrates an injection molding machine to which the cooling system of the present invention is applied. The machine is comprised of a clamp unit 100 and an injection unit 102, each mounted on a base 105.

The clamp unit 100 is comprised of a stationary platen 110 and a die height platen 108 which are connected by four tie bars at the platen corners. Two tie bars 112 and 114 are shown. The tie bars operate as guides for a movable platen 116. Mold halves 118 and 120 are affixed to the platens 116 and 110, respectively; and when the clamp is in the closed position shown, a mold cavity 122 is formed between the mold halves. A gate opening 123 passes through mold half 120 and stationary platen 110 to permit the injection of a plastic melt into the mold cavity 122. The moving platen 116 is operated by a clamp motor 124 mounted on the stationary platen 108. The motor 124 is connected to a ball screw 126 by a drive belt 127. A gear drive or other mechanical coupling may also be used. The ball screw nut 128 is mounted in a toggle mechanism 130 which provides a mechanical advantage for the motor 124 in operating the clamp unit 100.

The injection unit 102 includes an extruder mechanism comprised of a tubular barrel 140 with an extruder screw 142 rotationally and translationally mounted therein. The screw is journalled in a stationary member 144, and one end of the screw 142 is rotatably secured in a movable member 146. Rotational motion of the screw 142 is provided by an extruder motor 148 mechanically connected to the screw by a drive belt 150; rotation may also be implemented by any other suitable mechanical device. The movable member 146 rides on a pair of parallel bar guides, one of which is shown at 152, connected between the stationary members 144 and 154. An injection motor 156 mounted on the member 154 is connected to a ball screw 158 by a drive belt 160. The ball screw nut 162 is mounted in the movable member 146; and therefore, the motor 156 is operative to provide linear motion to the member 146 and the extruder screw 142 toward or away from stationary platen 110.

An ejector unit 170 is integrated with the mold and is operative to eject the finished molded part as the mold opens. The ejector unit 170 is coupled to an ejector motor 103. The machine control (not shown) activates the motor 103 at the appropriate time in the injection molding cycle. The ejector unit 170 is preferably under servocontrol to accommodate the various requirements and operations of different molds.

A die height unit 174 is typically integrated into the tie bars and platen 108 shown in FIG. 1. The die height unit 174 provides an adjustment of the spacing of die height platen 108, including toggle mechanism 130 and movable platen 116, relative to the stationary platen 110 to accommodate different molds having different mold thicknesses when the molds are in the closed position. The die height unit 174 is controlled by a die height motor 176. The die height adjustment can be manually controlled by the operator which results in the machine control producing forward or reverse command signals to the motor 176.

The injection sled 180 generally rides on tracks (not shown) on the base 105 and supports the entire injection unit 102, thereby permitting the injection unit 102 to be moved toward or away from the stationary platen 110. The injection sled is mechanically coupled to a sled motor 182. Again, the operation of this unit can be manually controlled by the operator which results in the machine control providing forward or reverse command signals to the motor 182. It should be noted that the various motors noted above could be AC induction, brushed AC or DC, brushless (permanent magnet) AC or DC, or any other type, as might be best suited for the particular application. In fact, it is intended that the cooling system of the present invention accommodate any combination of motor types, even linear motors, in order to optimize machine performance.

Figure 2:
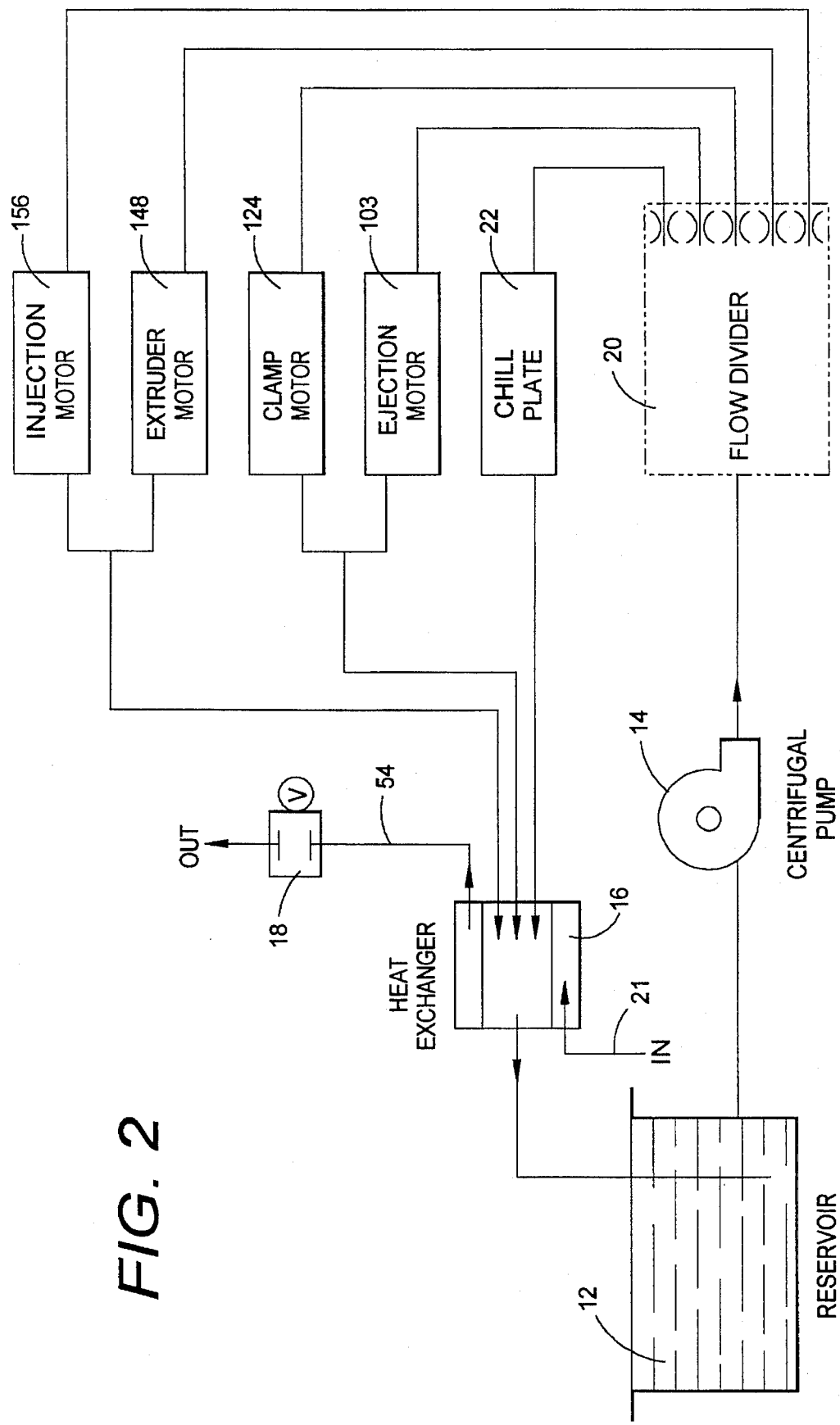
FIG. 2 is a schematic diagram of the cooling system used in conjunction with the injection molding machine of FIG. 1.

The specific elements associated with the liquid cooling system of the present invention are identified in FIGS. 1 & 2. The cooling system is a "contained" system to minimize potential for contamination of the coolant, having closed loop circulation of a suitable liquid coolant, such as a water/glycol mixture. Liquid not actively circulating through the conduits of the cooling circuit is stored in a reservoir 12.

Circulation of the fluid is initiated by a motor/pump 14 mounted on the reservoir. From the pump 14 the coolant flows to a flow divider manifold 20. The manifold 20 is provided with output ports, five in the illustrated embodiment, to facilitate connection to suitable conduits and distribution of the coolant to the injection motor 156, the extruder motor 148, the clamp motor 124, the ejector motor 103 and a chill plate 22. If desired, other machine elements or systems requiring cooling, such as the feed throat of the injection unit (not shown), can also be included in the cooling circuit. As illustrated in FIG. 2 the flow divider 20 allows parallel supply circuits for the motors and chill plate, so that each is cooled independently.

From the motors and chill plate, the coolant flows through suitable conduits to a heat exchanger 16. The heat exchanger 16 is a conventional liquid/liquid type unit, connected to a source 21 of tap or central chiller water that provides the heat sink for the system. Preferably, a water saver valve 18 is provided in the water flow path to provide temperature control for the coolant, as will be more fully described later.

Figure 3:
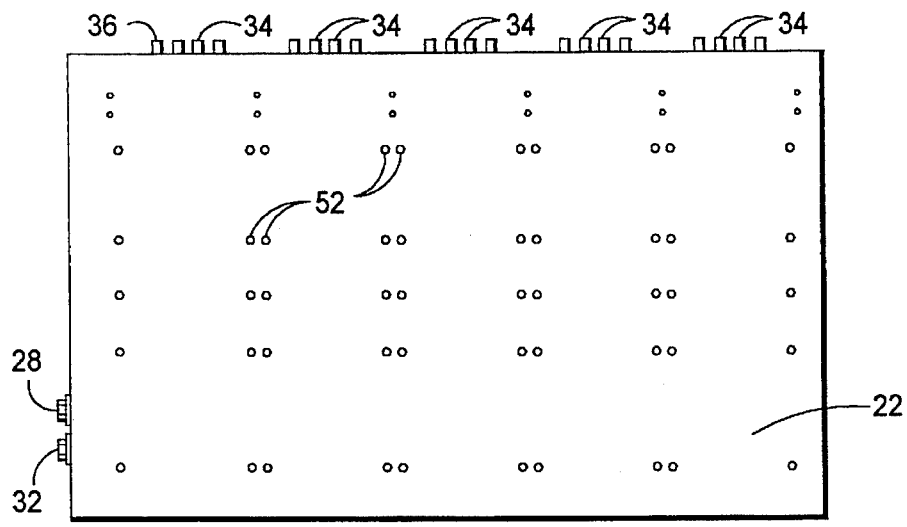
FIG. 3 is a front elevational view of a plate-type heat exchanger (chill plate) with integral electrical components according to the present invention.
Figure 7:
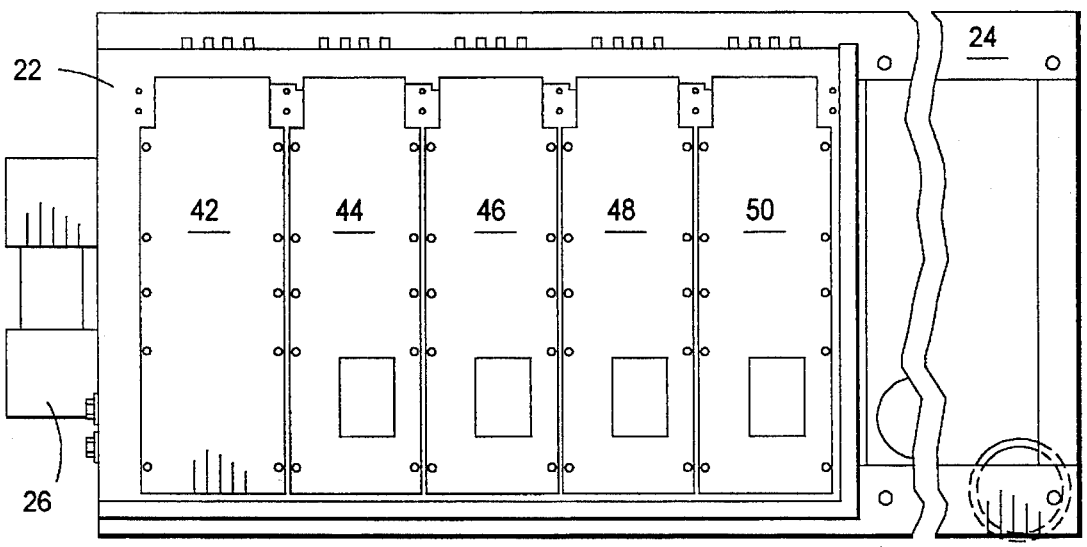
FIG. 7 is an assembly drawing for an electrical component mounting system incorporating the chill plate of FIG. 3.
Figure 8:
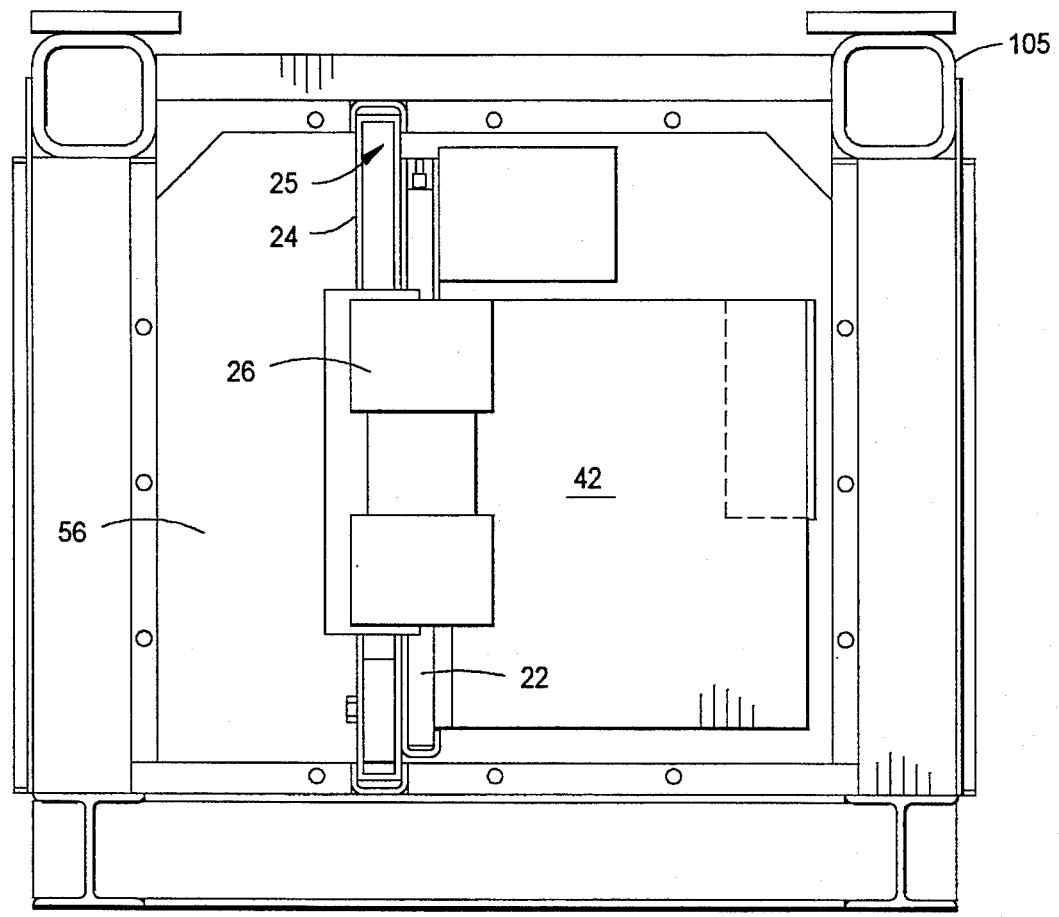
FIG. 8 is an end view of the assembly shown in FIG. 7 as it is positioned in the injection molding machine.

Referring to FIGS. 3–8, the chill plate 22 serves as a mounting surface for many of the electrical/electronic components required for operation of the injection molding machine, especially the high heat components associated with the electronic drives for the motors. Generally, a separate drive is provided for each motor, as well as a power supply 42 for the separate drives. Preferably, the drives 44,46,48,50 and power supply 42 are modular units to simplify mounting and service; FIGS. 7 and 8 show the relative location of the power supply 42, extruder motor drive 44, injection motor drive 46, clamp motor drive 48, and eject/die height motor drive 50. As also seen in FIG. 3, the chill plate 22 is specially adapted to provide a direct mounting surface for the heat producing components of the drive systems; mounting holes 52 are provided to facilitate attachment of the modular power supply 42 and drives 44,46,48 and 50. The various electrical/electronic components are attached as convenient to facilitate heat exchange, keeping the temperature of these components within the desired operating range to maximize their service life.

Figure 4:
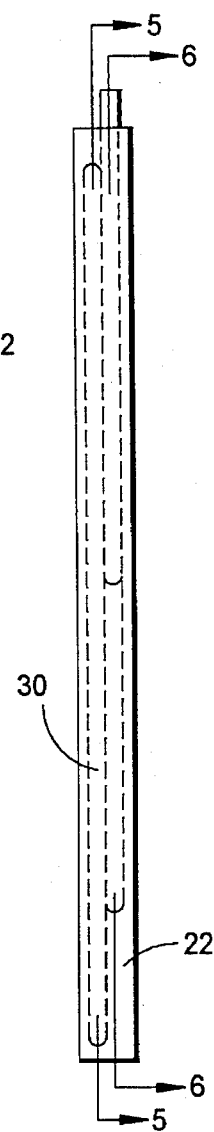
FIG. 4 is an enlarged end view of the chill plate shown in FIG. 3.
Figure 5:
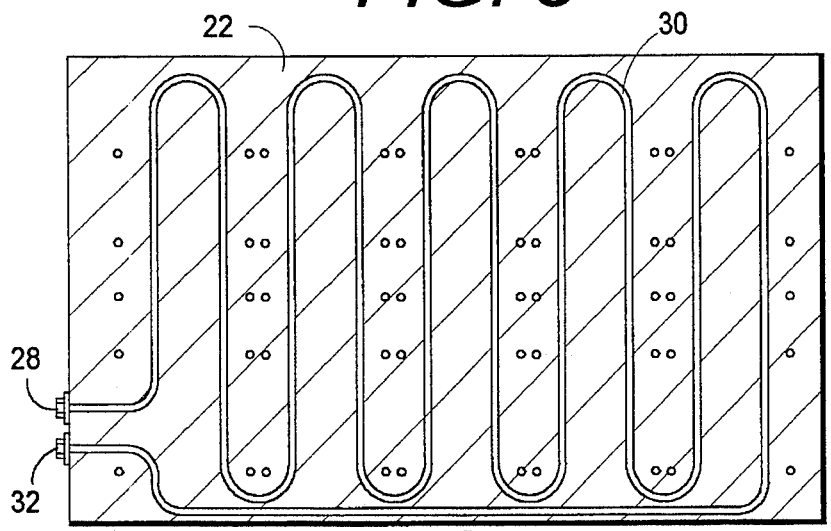
FIG. 5 is a cross-sectional view of the chill plate taken along line 5—5 as seen in FIG. 4.
Figure 6:
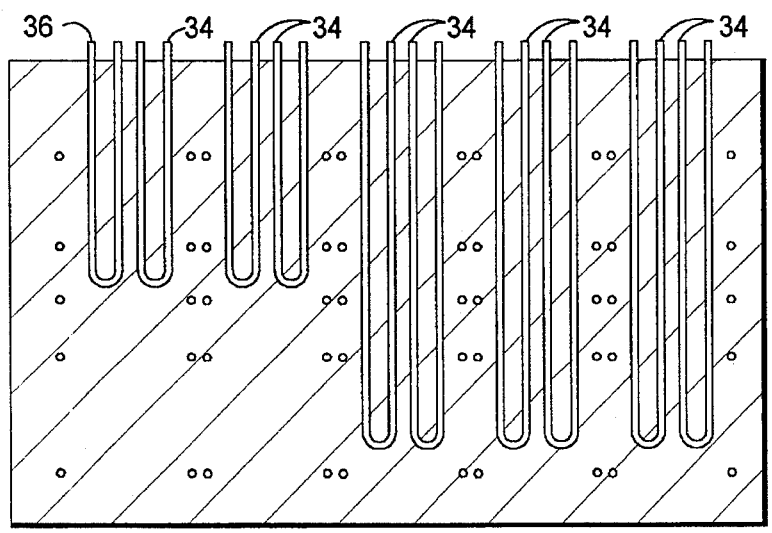
FIG. 6 is a cross-sectional view of the chill plate taken along line 6—6 as seen in FIG. 4.

The chill plate 22 is preferably a casting made of aluminum, including a stainless steel tube 30 formed to provide a serpentine flow path through the plate 22 and cast into the plate 22, thereby optimizing its heat exchange capacity and minimizing corrosion potential. FIGS. 4 and 5 show the relative position of the tube 30 in the plate and the preferred configuration, including inlet 28 and outlet 32.

Also cast into the plate 22 are dynamic braking resistors 34 and shunt loading resistor 36. The dynamic braking resistors 34 are used to dissipate the electrical energy produced during stopping or rapid slow-down situations, when the motors may function momentarily as generators. The shunt resistor 36 is necessary for removing excess energy from the DC bus (when DC motors are used). Since these resistors can produce significant heat, casting them directly into the chill plate provides effective heat transfer and confines them so the environment within the electrical cabinet 56 is not overly affected by radiated heat, while also providing a compact system which saves space within the cabinet.

Figure 9:
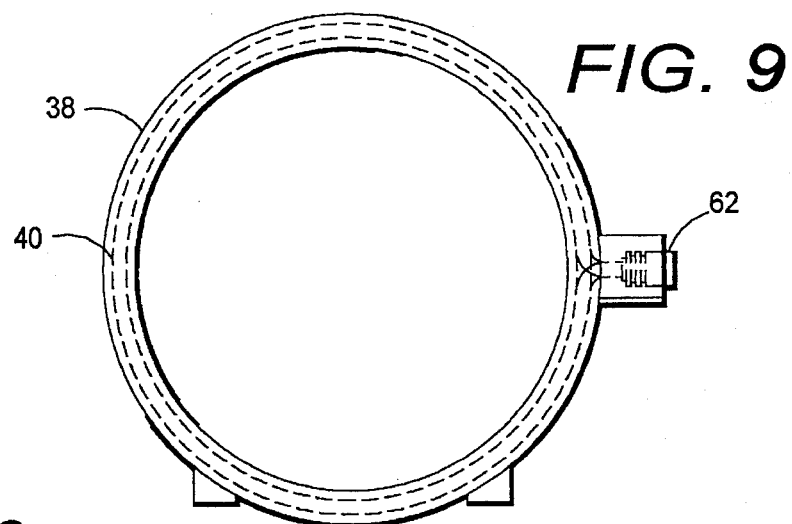
FIG. 9 is an end view of a motor housing with an integral heat exchanger.
Figure 10:
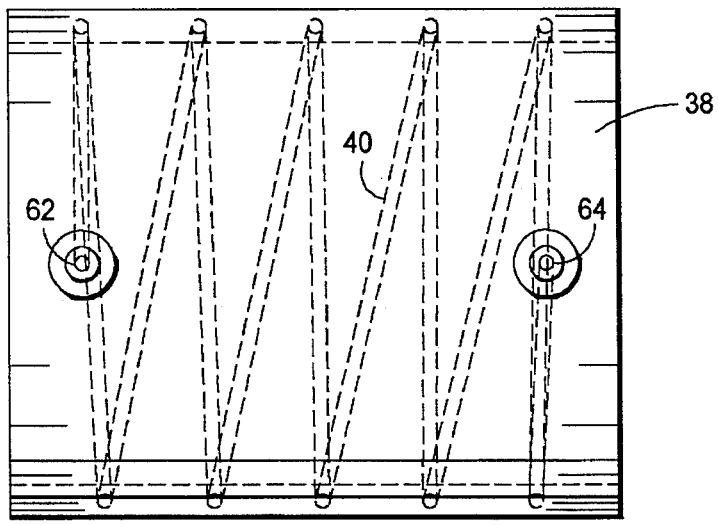
FIG. 10 is a front elevational view of the motor housing shown in FIG. 9.
Figure 11:
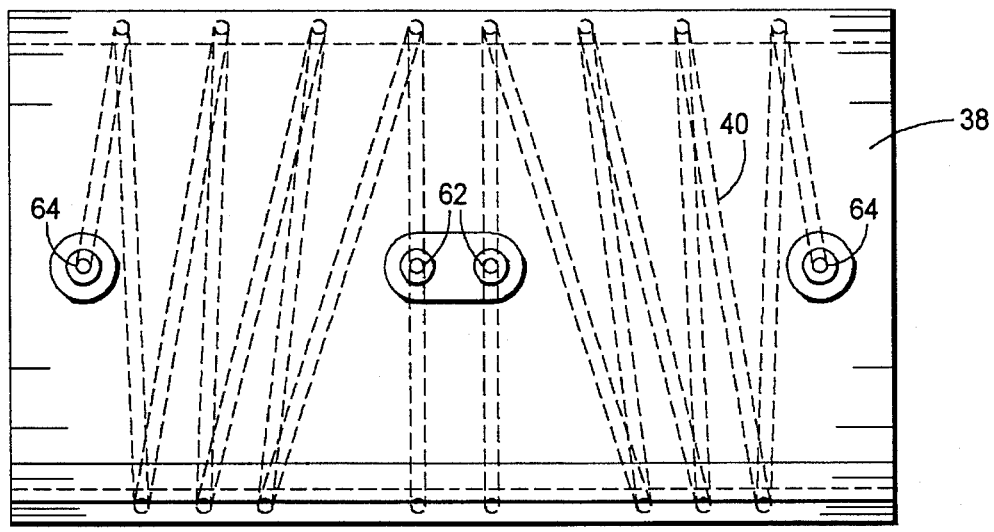
FIG. 11 is a front elevational view of an alternate configuration for the motor housing shown in FIG. 9.

The cooling of the various motors is preferably accomplished by providing for coolant flow through the motors stator housing 38 as shown in FIGS. 9–11. The housing 38 is basically a cast aluminum cylinder containing a stainless steel tube 40 formed in a helix and terminating in an inlet 62 and outlet 64. Where high horsepower is required, the motors often have very long stator housings. In such cases, two or more pieces of tubing 40 can be used, as seen in FIG. 11, to provide better temperature control over the length of the housing 38. Other types of flow passages, such as cast or extruded channels could also provide means for coolant circulation in the motor housing.

After coolant exits the chill plate 22 and motors 103, 124, 148 and 156, it is conveyed back to the reservoir 12. The coolant returning to the reservoir 12 is now at an elevated temperature and is passed through heat exchanger 16 to lower the temperature to the desired operating level. The flow of water through the heat exchanger 16 from source 21 is regulated by valve 18 in the outlet line 54 in order to remove sufficient heat from the coolant so that it leaves the heat exchanger 16 and returns for circulation at the desired temperature. This is simply accomplished by monitoring the temperature of the coolant where it exits the heat exchanger 16 and using a control algorithm to regulate the valve 18, keeping the coolant within the desired temperature range. The specific temperature of the coolant is not critical, although it is preferably as low as practical while still remaining above the dew point to minimize condensation. It has been found, for example, that the present cooling system circulating coolant at a flow rate of about six gallons per minute can maintain a suitable operating temperature effectively, within a range of about ±2° F.

In addition to the direct heat sink function described above, the chill plate 22 provides a means to provide temperature conditioned air within the electrical cabinet 56, allowing it to be closed to outside air. The sheet metal support 24 for the chill plate 22 forms a plenum 25 behind the chill plate 22. A blower 26 is mounted at the end of the plenum 25 to provide a forced air flow through plenum 25. The location of the blower 26 is adjacent the inlet 28 of the chill plate 22. Since this is the coldest part of the chill plate, any condensation of moisture in the air will occur on this part of the plate, where it can be directed away from the electronic components and drained from the electrical cabinet 56, if desired.

Referring again to FIGS. 1 and 2, a cycle of operation will briefly be described starting with the clamp unit 100 in the illustrated closed position. Also as illustrated, solid thermoplastic, thermoset or other material from the hopper 166 will have been plasticized by the screw 142 to form a quantity of liquid phase plastic melt or a "shot" in front of the screw. Plastication time is optimized by providing external heat to the barrel 140, typically by a plurality of circumferentially mounted heater bands 141. To initiate an injection cycle, the machine control provides a velocity command to the motor 156 in order to move linearly member 146 and screw 142 towards the platen 110. As the screw 142 moves linearly in the barrel 140 toward the stationary platen 110, the plastic melt is injected through the orifice 143 and gate opening 123 into the mold cavity 122. When the screw 142 completes its linear motion, the machine control transfers to the pack cycle. During the injection cycle and subsequent pack and hold cycles, the extruder motor controller is provided with a zero velocity signal to keep the extruder screw 142 from rotating due to the linear forces exerted on the screw 142.

In the pack cycle, the object is to continue to push the material into the mold to complete the mold filling process. At the end of a predetermined period of time, marking the end of the pack cycle, the machine control transfers to the hold cycle where pressure is maintained. The pack and hold cycles require that the injection motor 156 maintains a high torque (using high current) with little or no rotation; this condition generates significant heat in both the motor 156 and the components of the electronic drive 46. If motor temperature rises significantly, the torque available at a given current decreases, and the current would have to be increased to maintain torque, generating additional heat. The circulation of coolant keeps the motor at a suitable temperature to maintain the desired torque at the corresponding current, providing more efficient motor operation.

After a predetermined period marking the end of the hold cycle, the machine control transfers to a cooling cycle for a further period of time while the molded part cools. During the cooling cycle, the machine control initiates an extruder run cycle in which the extruder motor 148 is activated to extrude a new shot of molten material to the front of the screw 142. At the same time, the injection motor 156 must be operated to move the screw 142 away from the platen 110 while maintaining a predetermined pressure on the molten plastic material, i.e., a predetermined back-pressure on the extruder screw 142. The machine control causes the extruder screw motor 148 to rotate the screw to plasticize more plastic material and carry it to the front of the screw adjacent to the orifice 143. Simultaneously, the machine control may also cause the injection motor 156 to refrain to some degree from rotating in order to generate a predetermined back-pressure on the screw 142. As pressure builds up on the front of the screw, the drive control will have to supply more current to the motor 156 to maintain the zero velocity, i.e., to keep the motor from rotating. As noted previously, the higher current tends to generate additional heat and the liquid cooling allows the motor 156 to maintain consistent operating parameters. When the back pressure reaches the desired level, the motor 156 is caused to rotate, moving the screw 142 away from the platen 110 while also maintaining the predetermined back-pressure. Consequently, as the screw 142 rotates to build a shot of molten plastic, the screw will be moved away from the platen 110 with a controlled back-pressure until the full shot of plastic material is extruded.

When the screw 142 reaches a predetermined final position, the machine control stops the operation of the extruder motor 148 and issues a velocity command to the drive control for the injection motor 156 to move the screw further back, thereby relieving the pressure on the molten plastic material due to the back-pressure from the screw 142. At the end of the molded part cooling cycle, the control also provides a velocity command signal to the clamp motor 124 to shift the movable platen 116 in the direction away from the stationary platen 110 to open the mold. While the mold is opening, the control will provide command signals to the ejector unit 170 and ejector motor 103 to actuate the mold part ejector mechanism (not shown) carried by the mold half 118. The finished part is ejected from the mold, and the ejector motor 103 then returns the part ejector mechanism to its original position.

When a fully opened mold clamp position is detected, the control gives command signals to begin to moving the platen 116 in the opposite direction to again bring the mold halves together. The control will then generate velocity commands depending on the position of the platen 116 to control acceleration and deceleration and bring the mold halves into controlled contact. For example, movable platen 116 may initially be moved at a rapid rate toward stationary platen 110 to reduce overall cycle time until a predetermined position is reached. Thereafter, a command representing a low velocity is provided until another position is detected and contact of the mold halves is imminent. Under normal circumstances, the mold halves will be brought together to the fully closed position. However, if there is interference between the mold halves, a torque limit control will override the velocity control and reduce current to the motor to reduce motor velocity and motion to protect the mold halves from damage caused by the interference.

Assuming the mold halves reach the fully closed position, the torque command value is increased, and a command is given to move the toggle to a lock-over position as shown in FIG. 1. The mold clamping force is determined and controlled by the final position of the toggle mechanism 130. The machine is now ready to begin another full cycle. As with the injection motor 156 during pack and hold, the clamp motor 124 has to maintain torque with no rotation while the clamp is in the close position, generating significant heat. In fact, during the typical injection molding cycle there is a period of time when the clamp motor 124 and injection motor 156 must simultaneously maintain torque with no rotation; the liquid cooling system of the present invention has the capacity to dissipate the heat generated under such circumstances.

One of the drawbacks to implementing a complete liquid cooling system in injection molding machines is the extensive modifications required to adapt the components to liquid cooling (from air cooling); these modifications are complex and expensive. To reduce the expense and complexity of the system, the cooling circuit is preferably configured to supply several motors and their drives which could be in parallel or series. When the cooled components are configured in series, the coolant should preferably circulate through one or more of the motors before it goes to the chill plate 22. This configuration will raise the temperature of the coolant slightly before it enters the chill plate, further minimizing the possibility of condensation forming in the electrical cabinet.

As the size of the injection molding machine increases to a larger size to produce larger parts, e.g. 1500 tons or more of clamping force, two or more motors may have to be ganged together in order to obtain the desired mold clamping forces and injection/extrusion capabilities. With the present liquid cooling system, it is possible to use smaller motors, and, in some cases, only a single motor is required to operate satisfactorily the clamp and injection unit for a wider range of machine sizes, including machines of over 700 tons of clamping force. The cooling system maintains a consistent operating temperature regardless of the operating parameters or surrounding environment; accordingly the motor can be sized for the normal operating conditions and does not have to be "over-sized" to accommodate extreme temperature increases that might occur in certain installations.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims.

What is claimed is:

1. In an electrically powered and electrically controlled plastics processing machine having a plurality of heat-producing electrical components, a method for cooling the electrical components comprising the steps of:

(a) circulating a liquid coolant through a first circuit including a coolant inlet, a coolant outlet, and a coolant passageway for circulating the liquid coolant through an electric motor, the coolant passageway being positioned interiorly of the motor, thereby cooling the motor when it is in operation;

(b) circulating the liquid coolant through a second circuit including a plate member having a coolant inlet, a coolant outlet, and an interiorly positioned coolant passageway for circulating liquid coolant through the plate member, wherein at least one electrical component is mounted on a side of the plate member so that heat is transferred from the electrical component to the plate member, thereby cooling the electrical component when a circuit including the electrical component is energized;

(c) controlling the flow of the liquid coolant so that it circulates through the first and second circuits concurrently; and (d) controlling the temperature of the liquid coolant by means including a heat exchanger connected with the coolant outlets of the first and second circuits so that the heat accumulated by the liquid coolant is transferred from the liquid coolant to a heat sink, after the liquid coolant passes through the motor and after the liquid coolant passes through the plate member.

2. A method according to claim 1 further comprising the step of circulating air through a plenum formed on a cooled surface of the plate member to provide auxiliary cooling of electrical components contained within an enclosed electrical cabinet.

3. A method according to claim 1 wherein the step of controlling the flow of the liquid coolant so that it circulates through the first and second circuits concurrently involves flow of the liquid coolant through the first and second circuits in parallel.

4. A method according to claim 1 wherein the step of controlling the flow of the liquid coolant so that it circulates through the first and second circuits concurrently involves flow of the liquid coolant through the first and second circuits in series.

5. In an electrically powered and electrically controlled injection molding machine having at least one rotary electric motor with an associated electronic drive, a method for cooling the motor and electronic drive comprising the steps of:

(a) circulating a liquid coolant through a first circuit including a coolant inlet, a coolant outlet, and a coolant passageway for circulating the liquid coolant through the rotary electric motor, the coolant passageway being positioned in the stator of the motor, thereby cooling the motor when it is in operation;

(b) circulating the liquid coolant through a second circuit including a plate member having a coolant inlet, a coolant outlet, and an interiorly positioned coolant passageway for circulating liquid coolant through the plate member, wherein the electronic motor drive is mounted on a side of the plate member so that heat is transferred from the electronic drive to the plate member, thereby cooling the electronic drive when it is energized;

(c) controlling the flow the liquid coolant so that it circulates through the first and second circuits concurrently; and (d) controlling the temperature of the liquid coolant by means including a heat exchanger connected with the coolant outlets of the first and second circuits so that the heat accumulated by the liquid coolant is transferred from the liquid coolant to a heat sink, after the liquid coolant passes through the motor and after the liquid coolant passes through the plate member.

6. A method according to claim 5 further comprising the step of circulating air through a plenum formed on a cooled surface of the plate member to provide auxiliary cooling of electrical components contained within an enclosed electrical cabinet and to reduce condensation on the plate member.

* * * * *